3 Sheets--Sheet 1.

H. LAW.
Paper-Bag Machine.

No. 5,015. Reissued July 30, 1872.

Witnesses:
Francis McArdle
Geo W. Mabee

Inventor:
Hervey Law
PER
Attorneys.

THE NORRIS PETERS CO., PHOTO-LITHO., WASHINGTON, D. C.

3 Sheets--Sheet 2.

H. LAW.

Paper-Bag Machine.

No. 5,015. Reissued July 30, 1872.

Witnesses:

Francis McArdle

Geo W. Mabee

Inventor:

Hervey Law

PER Munn & Co.

Attorneys.

THE NORRIS PETERS CO. PHOTO-LITHO., WASHINGTON, D. C.

H. LAW.

Paper-Bag Machine.

No. 5,015. Reissued July 30, 1872.

Witnesses:

Francis McArdle

Geo W. Mabee

Inventor:

Henry Law

PER Munn & Co

Attorneys.

THE NORRIS PETERS CO., PHOTO-LITHO., WASHINGTON, D. C.

UNITED STATES PATENT OFFICE.

HERVEY LAW, OF CHATHAM, NEW JERSEY.

IMPROVEMENT IN PAPER-BAG MACHINES.

Specification forming part of Letters Patent No. 104,169, dated June 14, 1870; reissue No. 5,015, dated July 30, 1872.

Specification describing a new and Improved Machine for Making Paper Bags, invented by HERVEY LAW, of Chatham, in the county of Morris and State of New Jersey.

My invention consists of certain mechanical devices arranged so as to form, automatically, paper bags, such as are used for flour, &c., and which are made in one piece from the roll of paper. The paper is folded in the direction of its length from the two sides, so that the edges overlap one another about an inch in the center, the edges being pasted together. There are machines already in use for folding the paper in this way which I use in combination with my invention. The paper is drawn through the folding-machine with the seam on the upper side, centrally, by a pair of rollers, which feed it along to the devices for forming the bottom of the bag. The feed-rollers then stop until the bottom is formed, and the bag cut off the required length, when they again feed the paper forward, pushing out of the machine the bag already formed, and so on, making a bag to every revolution of the machine; but to describe my invention more particularly, so that those versed in the arts and manufactures may be enabled to construct and use the same, I will refer to the accompanying drawing forming a part of this specification, in which—

Figure 1:
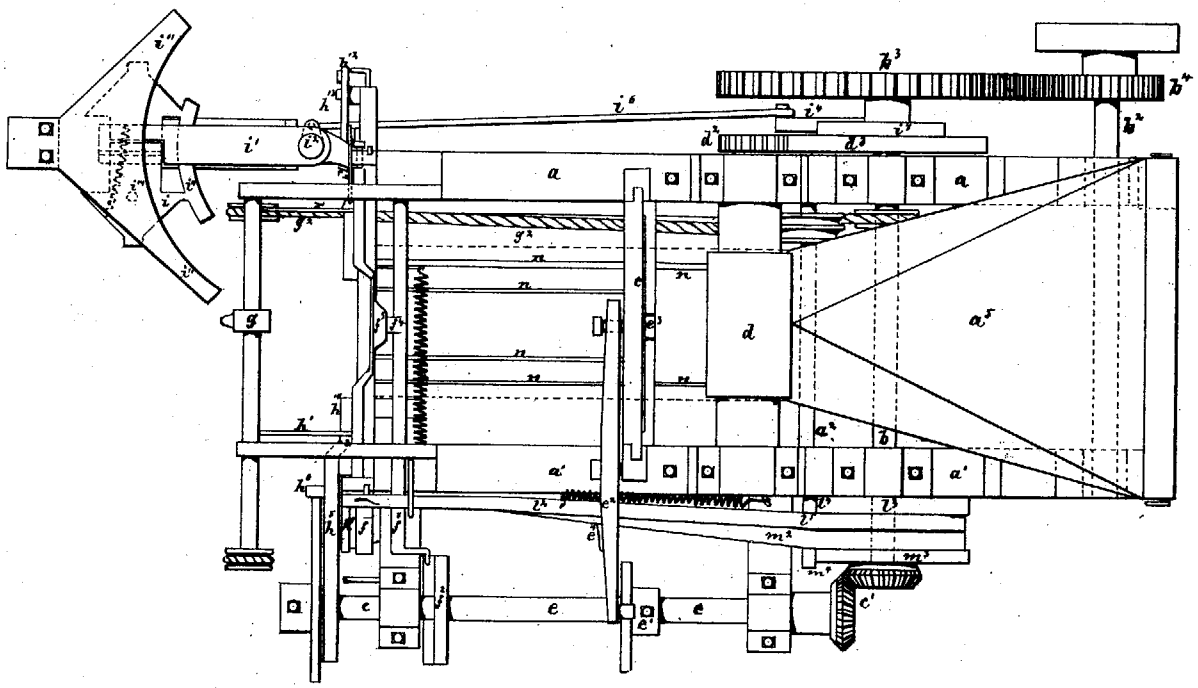
Figure 2:
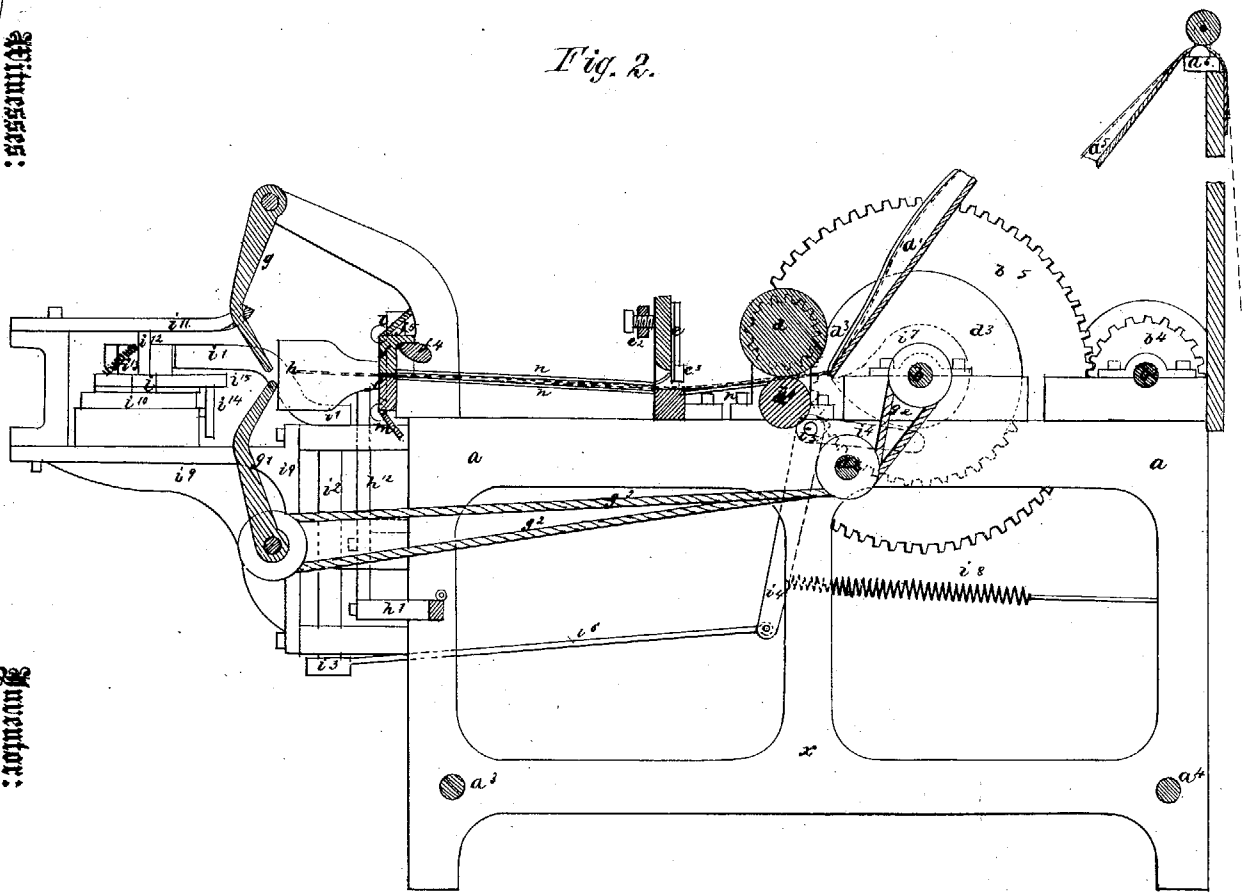
Figure 3:
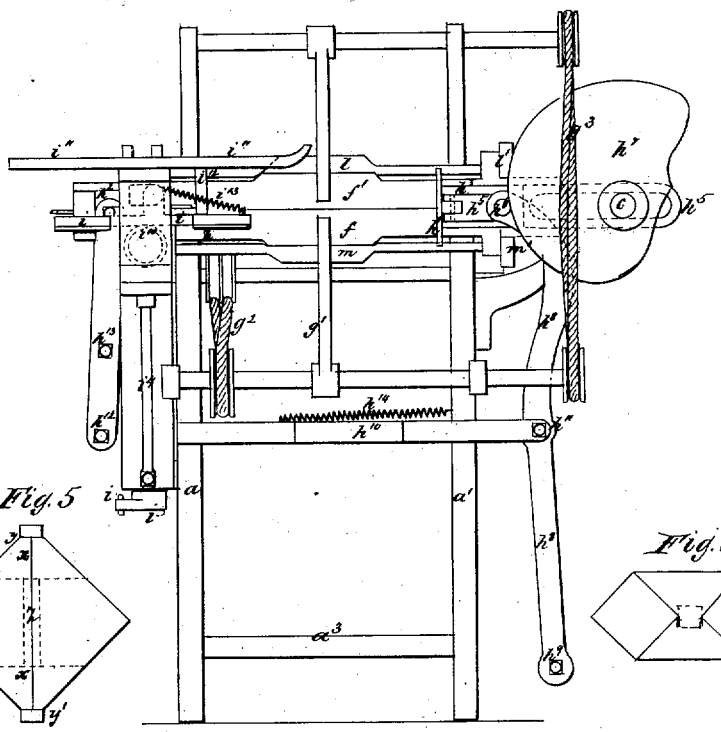
Figure 5:
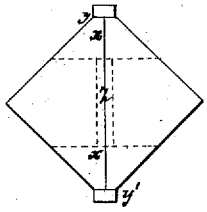
Figure 6:
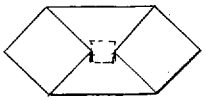
Figure 4:
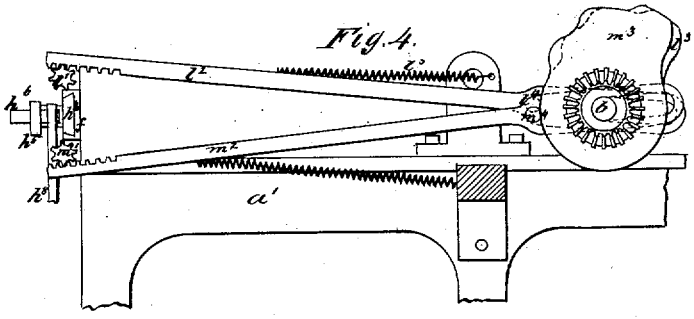

Figure 1 is a plan. Fig. 2 is a sectional elevation through the center of the machine. Fig. 3 is a front elevation. Fig. 4 is a partial side elevation, and Figs. 5 and 6 are views of the bottom of the bag.

Similar letters of reference indicate corresponding parts.

The side frames $a$ and $a^1$ are fastened together by the rods $a^2$ $a^3$ $a^4$, and are provided with bearings, in which the main shaft $b$ works, which is driven by the counter-shaft $b^2$ and wheel and pinion $b^3$ $b^4$. The side shaft $c$ is driven by the main shaft $b$ through the miter-wheels $c'$. The paper is drawn through the former or folder $a^5$, and one of the edges pasted by the pasting-roller $a^6$, and fed the required length by the feed-rollers $d$ and $d^1$. On the shaft of roller $d$ is fastened the pinion $d^2$, which is driven by the segmental wheel $d^3$ fast to the main shaft $b$. The length of paper fed along for different-sized bags is governed by the number of teeth in the pinion $d^2$. Just in front of the feed-rollers $d$ and $d^1$ is the knife $e$ for cutting off the bag, and under which the paper passes as it leaves the feed-rollers. The knife is pressed down after the feed has stopped by the cam $e^1$ on the side shaft $c$, raising the outer end of the lever $e^2$, the inner end of which is connected with the slide to which the knife is attached. Fastened to the knife $e$ are two small knives, $e^3$, standing at right angles thereto, for slitting the paper, as shown at Figs. 5 and 6, the object of which will be explained hereafter.

The knife is raised away from the paper by the spring $e^4$, fastened to the lever $e^2$ and the frame $a^1$. Bolted to the frames $a$ and $a^1$ is the bed $f f^1$, standing vertically, against which the bottom of the bag is formed, the upper portion $f^1$ of which slides in bearings provided therefor, so as to allow the paper to feed through the center of the bed. The part $f^1$ is raised by the cam $f^2$, fast to the shaft $c$, working against a projection at the end of the small shaft $f^3$, which is provided with a wiper, $f^4$, working under the lug $f^5$ on the back of the sliding portion $f^1$ of the bed. It is raised just before the paper commences to feed and held open until the feed stops. Then the cam $f^2$ releases the shaft $f^3$, the slide $f^1$ falls of its own weight, and holds the paper fast. So soon as the paper is fed forward and held firmly, the fingers $g$ and $g^1$, which have a continuous rotary motion, and which are driven by a belt or chain, $g^2$, from the main shaft $b$ onto the lower finger-shaft, are in the position shown in the drawing. This feature is essential, as without it the cross-folding cannot be smoothly made. The object of the fingers is to spread out and push back the two lips of the paper tube, assisting the side folders $h$ $h^1$ in their office. The fingers $g$ and $g^1$ are connected together by the belt or chain $g^3$. The first folders, $h$ and $h^1$, are pivoted to slides $h^2$ $h^3$ working in guides on the bed $f$, and having a horizontal motion—that is, to and from the center of the bed. The connections between the folders $h$ and $h^1$ and the slides $h^2$ $h^3$ are made sufficiently tight, so as to overcome the friction of the slides $h^2$ $h^3$ in the guides; or they may be provided with springs, which will hold the folders at right angles to the slides, when they are being moved forward, until the slides are prevented from going any further; then the folders are thrown down against the bed $f^1$, or in a parallel position to the slides. They are withdrawn in this position until the slides are again stopped, when the folders are raised again at right angles to the slides, and are moved forward until they get to the position shown in the drawing. To the folders $h$ $h^1$ are pivoted the connecting-links $h^4$ $h^5$. The other end of $h^5$ is slotted so as to embrace the shaft $c$, and is also provided with a roller, $h^6$, against which the cam $h^7$ works. The motions of the two first folders $h$ and $h^1$ are similar, and which folders are connected together by the lever $h^8$, one end of which is connected to the connecting-link $h^5$. The fulcrum is at the other end, $h^9$, on a bracket from the side frame $a^1$. The cranked rod $h^{10}$ is pivoted to the lever $h^8$ at $h^{11}$, and to the lever $h^{12}$, whose fulcrum is at $h^{13}$, which is connected with the folder $h$ by the connecting-link $h^4$. The rod $h^{10}$ is cranked, so as to allow the finger $g^1$ to pass, and to it is fastened the spring $h^{14}$, which is so placed as to cause the roller $h^6$ on the connecting-link $h^5$ to press against the cam $h^7$. The folders $h$ and $h^1$, which are thrown against the bed $f$ by the cam $h^7$, press against the edges and open the ends of the paper, which is in the form of a flat tube; at the same time the fingers $g$ and $g^1$ enter and aid in spreading out the end of the flat tube of paper at right angles to the motion of the folders. The object of the folders $h$ $h^1$ is threefold: First, to press the two edges of the tube in toward the center; second, to press them against the bed $f$ $f^1$, so as to make the crease or fold; and, third, to hold them there while the paster and cross-folders $l$ and $m$ act. After the first fold the bottom of the bag would appear as shown at Fig. 5. $y$ $y'$ are the slits made by the small knives $e^3$. The object of cutting the paper in this way is to get rid of the lump that would otherwise be after the second fold, as these parts overlap one another in the center of the bag, as shown in Fig. 6. While the first folders $h$ $h^1$ are holding the paper, as just shown, the paster $i$ works forward and pastes the paper on the parts marked $x$, Fig. 5, and also, if found necessary, a strip in the center about an inch wide, marked $z$. The paster $i$ is shaped in the form of the parts to be pasted, having two triangular forms, with or without the center strips, to receive and distribute the paste only when needed, and is hinged to an arm, $i^1$, which is fast to a vertical shaft, $i^2$, working in bearings provided therefor on brackets from the frame $a$. On the lower end of the shaft $i^2$ is fastened the crank $i^3$, which is connected to the bell-crank lever $i^4$, whose fulcrum is at $i^5$ on the frame $a$ by the rod $i^6$. Fastened to the shaft $b$ is the cam $i^7$, which operates the short arm of the bell-crank lever $i^4$. Attached to the frame $a$ and to the long arm of the lever $i^4$ is a spring, $i^8$, which operates against and keeps the short arm of the lever $i^4$ against the cam $i^7$. On the bearings which carry the vertical shaft $i^2$ is fastened the bracket $i^9$, which supports the paste-pot and roller $i^{10}$. At the extreme end is a standard, to which is bolted the guide-plate $i^1$, which holds the paster $i$ in a horizontal position, as shown in the drawing.

The operation of the paster is as follows: The cam $i^7$, in depressing the short arm of the bell-crank lever $i^4$, partially revolves the crank $i^3$ on the bottom of the shaft $i^2$, and, consequently, moves the paster around toward the bed $f$. The paster is kept in a horizontal position until the stud $i^{12}$ has cleared the guide-plate $i^{11}$; then the spring $i^{13}$, one end of which is fastened to the arm $i^1$ and the other end to the paster, moves the paster into a vertical position, in which position it presses against the paper and leaves thereon sufficient paste. It is then moved back by the action of the spring $i^8$, when the stud $i^{12}$, striking the inclined portion of the guide-plate, moves the paster into a horizontal position again, in which position it passes over and takes up some of the paste from the paste-roller $i^{10}$. To prevent the paster $i$ from pressing too hard on the paste-roller $i^{10}$ the roller-shaft is fitted with the friction-wheel $i^{14}$, which is a little larger than the paste-roller, and which works against the depressed portion $i^{15}$ of the paster $i$. The paste-roller is made to revolve by the friction-wheel $i^{14}$ bearing against the portion $i^{15}$ of the paster, and the right quantity of paste is left on the paster; otherwise the paster itself, pressing hard on the paster-roller, would be liable to crowd the paste off. When the paster $i$ moves up against the bed $f$ the second folders $l$ and $m$ turn on their centers to a position in line with the bed $f$, making a flat surface for the paster to press against, before which motion the folders $l$ and $m$ are in the position shown in the drawing—that is, they incline back from the bed $f$ to allow the fingers $g$ $g^1$ to pass, as it is necessary to make the fingers work as close to the bed $f$ as possible. As soon as the paster $i$ has moved away from the paper, and before the first folders $h$ and $h^1$ move, the second folders $l$ and $m$ turn over on their centers so as to partly make the second fold. The upper one, $l$, works on centers on the top of the sliding portion $f^1$ of the bed, and the lower one, $m$, on centers on the bed $f$, they each having a pinion on their shafts $l^1$ and $m^1$, which are worked by the racks on the rods $l^2$ and $m^2$. The other ends of these rods are slotted, so as to work on the shaft $b$. The cams $l^3$ and $m^3$ are fast to the shaft $b$ and work against rollers $l^4$ and $m^4$ on the rods $l^2$ $m^2$. When the second folders are in this position—that is, partly closed—the first folders $h$ $h^1$ are withdrawn, as already described. As the two points of the cross or second fold overlap each other they cannot both be pressed home at the same time, but the folder $l$ first moves around its full distance, followed at the proper time with folder $m$, pressing the paper down, and leaving it as shown at Fig. 6. They are then opened, as shown in the drawing, by the action of the springs $l^5$ and $m^5$, which are fastened to the rods $l^2$ and $m^2$ and to the frame $a^1$. The sliding portion of the bed is raised by the cam $f^2$, and the rollers $d$ and $d^1$ commence to feed the paper forward, pushing out of the machine the bag just formed. $n$ $n$ $n$ are wires for guiding the paper from the feed-rollers to the bed $f$ $f^1$ of the machine. If found necessary another pair of rollers may be placed just behind the bed, so as to assist in discharging the bag from the machine. They may be run by a belt from the other rollers, and have a greater circumferential velocity, which will tend to tear the bag from the paper if the knife does not make a clean cut.

I will now summarize the operation of the machine: The paper is drawn from a roll of indefinite length, and, as it passes into the machine it is pasted on one edge, folded over, passes between the feed-rollers (generally narrower than the tube) in the form of a tube, and through the machine far enough to allow the bottom fold. The feed then stops, the gate shuts down upon the tube, the side folders act, the fingers enter the tube and press or push back the centers of the two lips of the tube, forming the right-angle points or corners, the side folders press down onto the bed $f$ $f$, and the first fold is made; immediately the paster presses against a portion of the fold, leaving sufficient paste on the partly-folded bottom. The cross-folders then act, turning the corners over partly onto the side folders; the side folders then are rapidly withdrawn, the cross-folder $l$ is brought home, followed by the cross-folder $m$, which finishes the folding. The folders resume their original position, the gate opens, and the completed bag is forced out, and another takes its place.

Having thus described my invention, I claim as new and desire to secure by Letters Patent—

1. The folders $h$ $h^1$, constructed and operating substantially as described.

2. The fingers $g$ and $g^1$, in combination with the folders $h$ and $h^1$, constructed and operated substantially as described.

3. The paster $i$, constructed and operated substantially as described.

4. The combination of the side folders $h$ $h^1$, and the cross-folders $l$ and $m$, constructed and operated substantially as described.

5. In combination, for forming a paper tube, flat at the point of folding, the fingers $g$ $g^1$ and the paster $i$, as specified.

HERVEY LAW.

Witnesses:
T. B. MOSHER,
GEO. W. MABEE.